United States Patent
Zheng et al.

(10) Patent No.: US 12,385,235 B2
(45) Date of Patent: Aug. 12, 2025

(54) PRESSURE BALANCE VALVE APPARATUS

(71) Applicant: AS America, Inc., Piscataway, NJ (US)

(72) Inventors: Xiaoping Zheng, Guangzhou (CN); Xiaojing Ye, Edison, NJ (US)

(73) Assignee: AS America, Inc., Piscataway, NJ (US)

( * ) Notice: Subject to any disclaimer, the term of this patent is extended or adjusted under 35 U.S.C. 154(b) by 118 days.

(21) Appl. No.: 18/033,491

(22) PCT Filed: Oct. 28, 2021

(86) PCT No.: PCT/US2021/056986
§ 371 (c)(1),
(2) Date: Apr. 24, 2023

(87) PCT Pub. No.: WO2022/094033
PCT Pub. Date: May 5, 2022

(65) Prior Publication Data
US 2023/0400119 A1    Dec. 14, 2023

(30) Foreign Application Priority Data

Oct. 30, 2020    (WO) ............... PCT/CN2020/125392

(51) Int. Cl.
*F16K 31/385*    (2006.01)
*E03C 1/02*    (2006.01)

(52) U.S. Cl.
CPC .......... *E03C 1/023* (2013.01); *F16K 31/3855* (2013.01)

(58) Field of Classification Search
CPC ...... E03C 1/023; E03C 1/0408; E03C 1/0409; G05D 23/1313; F16K 11/20; F16K 11/202; F16K 19/006; F16K 31/3855; F16K 31/145
See application file for complete search history.

(56) References Cited

U.S. PATENT DOCUMENTS

| | | | |
|---|---|---|---|
| 482,049 A * | 9/1892 | Pomper | F16K 11/202 137/637.4 |
| 2,563,154 A * | 8/1951 | Brown, Jr. | F16K 11/202 137/556.6 |
| 11,203,856 B2 | 12/2021 | Li et al. | |
| 2018/0355988 A1 | 12/2018 | Jones et al. | |

(Continued)

FOREIGN PATENT DOCUMENTS

| | | | |
|---|---|---|---|
| KR | 20040031399 A * | 4/2004 | ........... F16K 27/044 |
| WO | WO92/01883 A1 | 2/1992 | |
| WO | WO2019/083942 A1 | 5/2019 | |

OTHER PUBLICATIONS

Machine English translation of KR20040031399 (Year: 2024).*

(Continued)

*Primary Examiner* — Hailey K. Do
(74) *Attorney, Agent, or Firm* — Tyler A. Stevenson; Anna-Lisa L. Gallo (57) ABSTRACT

A valve apparatus comprising a push button assembly coupled to a pressure balance valve, wherein the push button assembly comprises a pushbutton configured to be pressed/released and to be rotated, a first press/release of the button opens the valve, a second press/release of the button closes the valve, and a rotation of the button adjusts water temperature. A push button assembly comprising an axial press/release on/off function and an independent rotary setting function.

20 Claims, 10 Drawing Sheets

(56) References Cited

U.S. PATENT DOCUMENTS

2020/0208384 A1 7/2020 Wang et al.
2020/0210606 A1 7/2020 Wagner et al.

OTHER PUBLICATIONS

International Search Report mailed Jan. 28, 2022 in corresponding International Application No. PCT/US2021/056986(2 pages).

* cited by examiner

PRESSURE BALANCE VALVE APPARATUS

The disclosure is directed to a pressure balance valve apparatus for a shower and/or bathtub, in particular, to a push-and-turn pressure balance valve.

BACKGROUND

Pressure balance valves employ a single handle for controlling the on/off function, water volume, and temperature. It is not always possible to easily adjust the handle for a desired temperature control. Desired is a mechanism for a pressure balance valve that allows for better control of temperature. Also desired is a pressure balance valve with which on/off function and temperature control are decoupled.

SUMMARY

Accordingly, disclosed is a valve apparatus comprising a push button assembly coupled to a pressure balance valve, wherein the push button assembly comprises a push button configured to be pressed/released and to be rotated, a first press/release of the button opens the valve, a second press/release of the button closes the valve, and a rotation of the button adjusts water temperature.

In some embodiments, rotation of the button may also adjust water flow rate. In certain embodiments, a full rotation of the button closes the valve.

In some embodiments, disclosed is a pressure balance valve comprising an on/off mechanism and a temperature control, wherein the on/off mechanism and temperature control are decoupled.

Also disclosed is a push button assembly, comprising a push button configured to be pressed/released and to be rotated; and a stem coupled to the button, wherein a press/release of the button moves the stem in a direction of the press/release, a first press/release of the button rotates the stem in counter-clockwise or clockwise direction, and a second press/release of the button rotates the stem in the other of the counter-clockwise or clockwise direction.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DISCLOSURE

Figure 1:
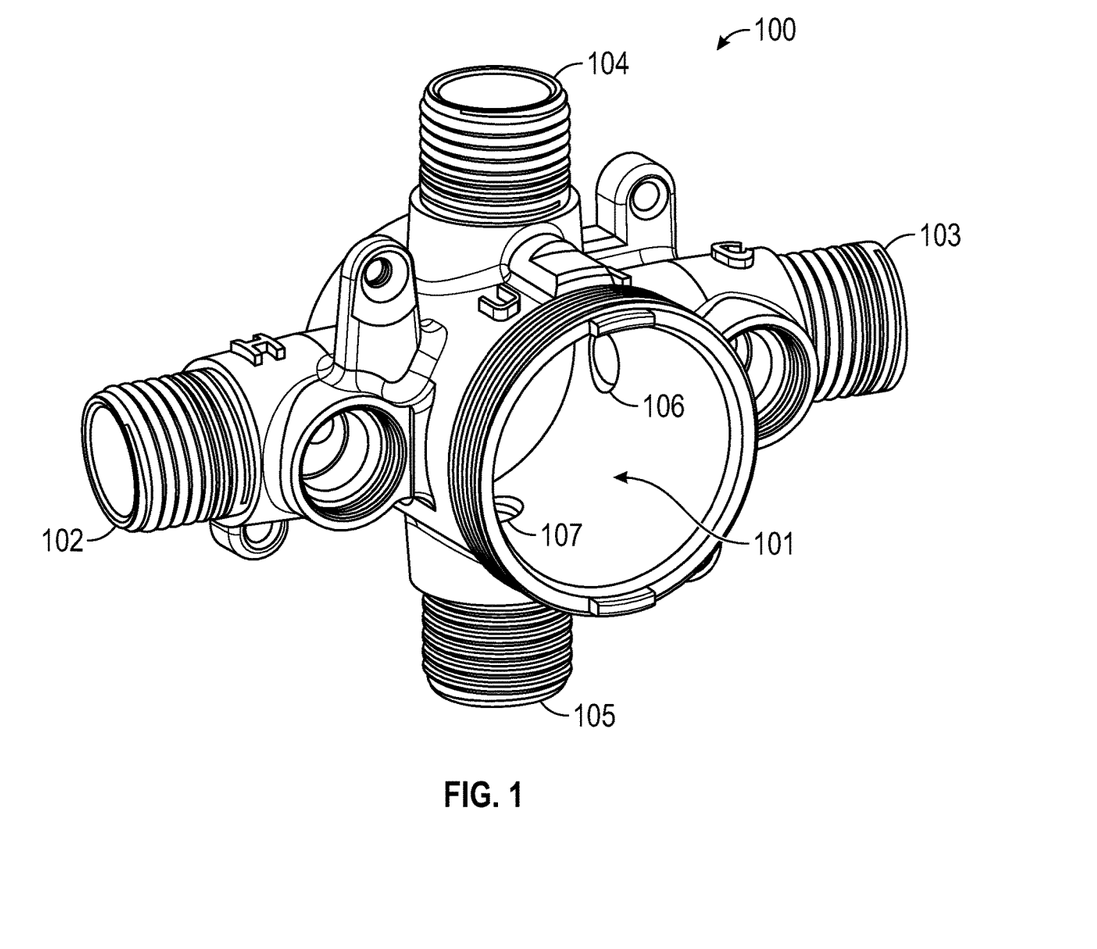
FIG. 1 depicts a rough-in valve, according to an embodiment.

FIG. 1 shows rough-in valve 100 according to an embodiment. Rough-in valve 100 comprises valve chamber 101 configured to receive a valve manifold. Rough-in valve 100 comprises first inlet 102 and second inlet 103, configured to be in flow communication with a hot water source and a cold water source, respectively. Rough-in valve 100 comprises first outlet 104 configured to be in flow communication with a first outlet line, for instance a shower outlet line, and a second outlet 105 configured to be in flow communication with a second outlet line, for instance a tub outlet line. Visible is inlet passageway 106 and outlet passageway 107.

Figure 2A:
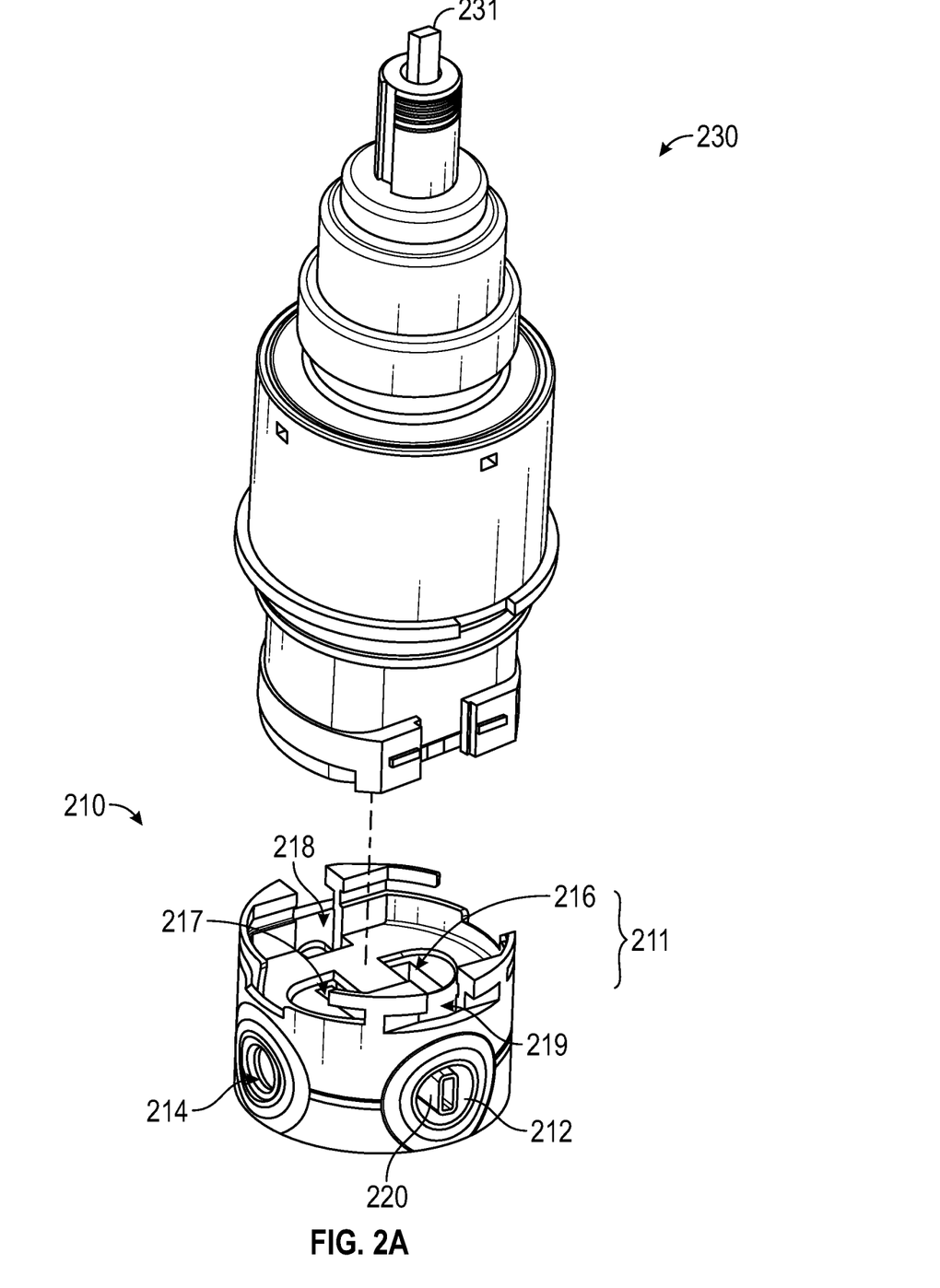
FIG. 2A and FIG. 2B show a pressure balance valve/manifold assembly, according to an embodiment.

FIG. 2A shows manifold 210 in a position to receive pressure balance fluid mixing valve 230, according to an embodiment. Manifold 210 is configured to receive and removably couple to pressure balance valve 230 in manifold cavity 211. Manifold 210 comprises first outlet 212, second outlet 213 (not visible) opposite first outlet 212, inlet 214, and inlet 215 (not visible) opposite inlet 214. Manifold transition 217 is in flow communication with cavity 211 and inlet 214; manifold transition 216 is in flow communication with cavity 211 and inlet 215 (not visible). Shown also is manifold channel 218, which is in flow communication with cavity 211, and manifold outlets 212 and 213 (not visible/opposite 212). Likewise, manifold channel 219 is in flow communication with cavity 211 and outlets 212 and 213. Venturi tube 220 is present in a pathway connecting outlets 212 and 213. Pressure balance valve 230 comprises valve stem 231.

Figure 2B:
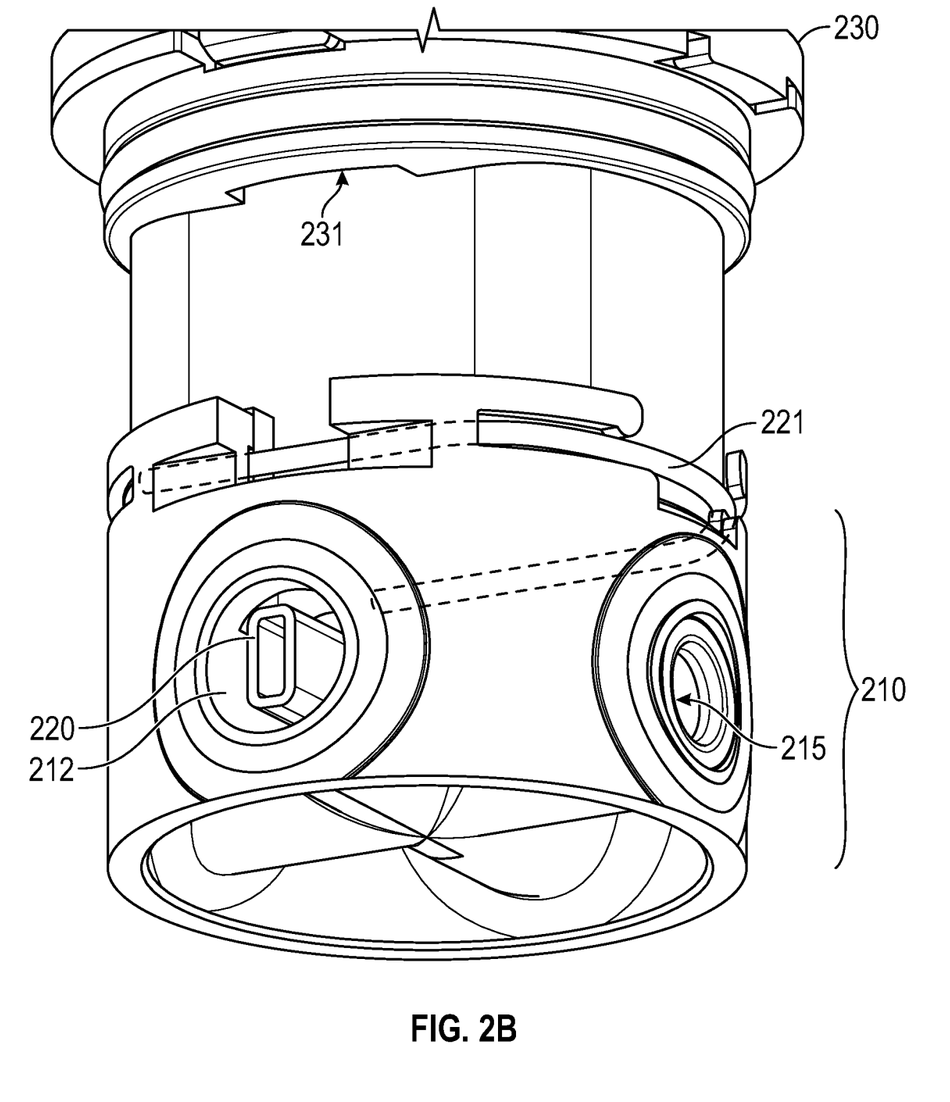

FIG. 2B depicts manifold 210 and pressure balance valve 230 in an assembled configuration, according to an embodiment. Shown are first outlet 212, venturi 220, and inlet 215. The manifold 210/pressure balance valve 230 assembly comprises U-shaped attachment pin 221, having some portions shown in "see-through" view. Fluid mixing valve outlet 213 (not visible) is aligned with manifold channel 219 (FIG. 2A) and in flow communication with manifold outlet 212.

Figure 3:
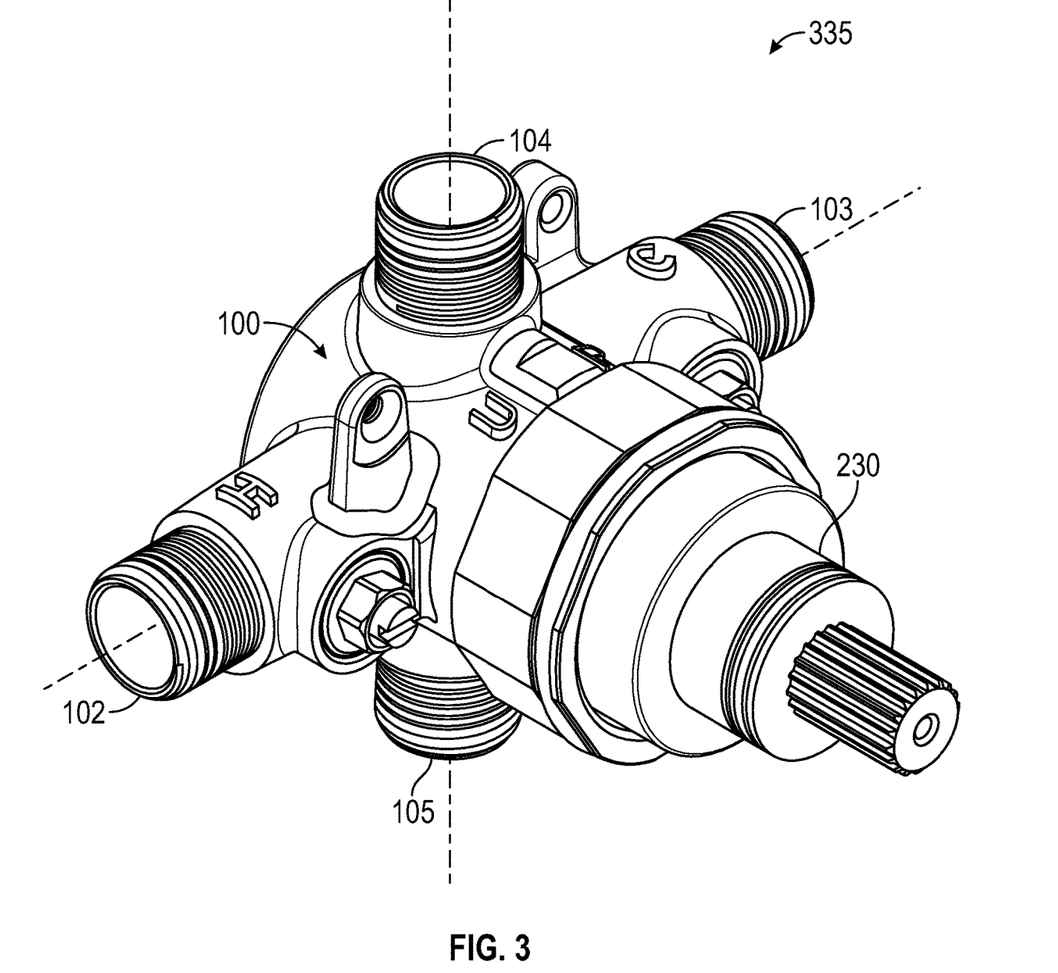
FIG. 3 shows a rough-in valve/pressure balance valve/manifold assembly, according to an embodiment.

FIG. 3 illustrates manifold 210/pressure balance valve 230/rough-in valve 100 assembly 335, according to an embodiment. Assembly 335 comprises manifold 210/pressure balance valve 230 assembly positioned in rough-in valve chamber 101. Manifold outlet 212 (not visible) may be aligned with and in flow communication with outlet 104, which may be fluidly coupled to a shower outlet. Manifold outlet 213 (not visible) may be fluidly connected to outlet 105, which may be fluidly coupled to a tub spout. Inlets 102 and 103 may be fluidly connected to manifold inlets 215 and 214 (not visible), respectively.

Figure 4A:
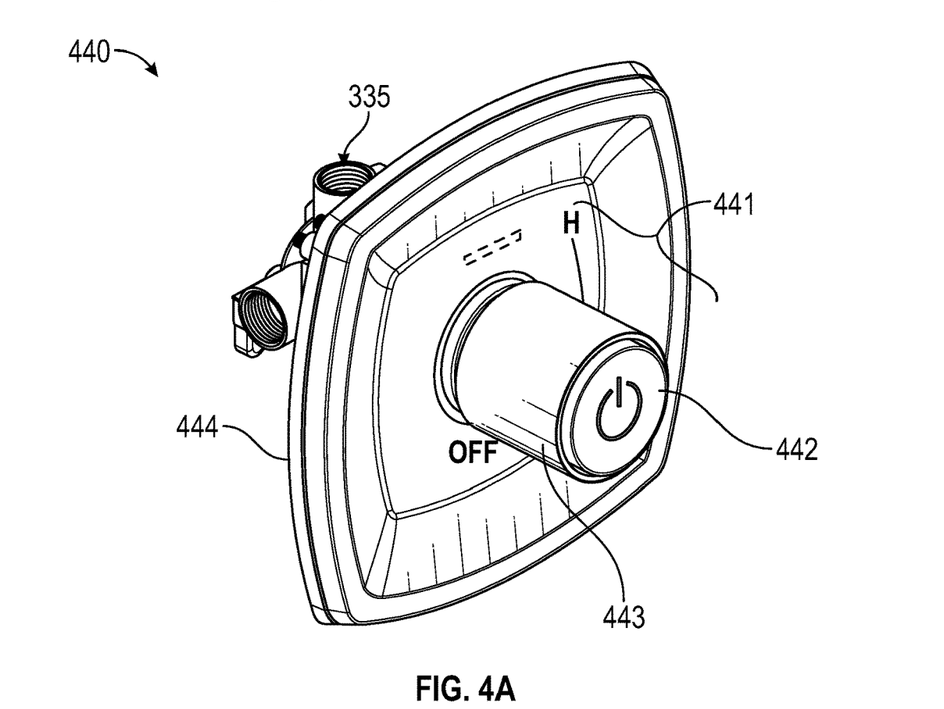
FIG. 4A and FIG. 4B illustrate a push/turn pressure balance valve apparatus, according to an embodiment.
Figure 4B:
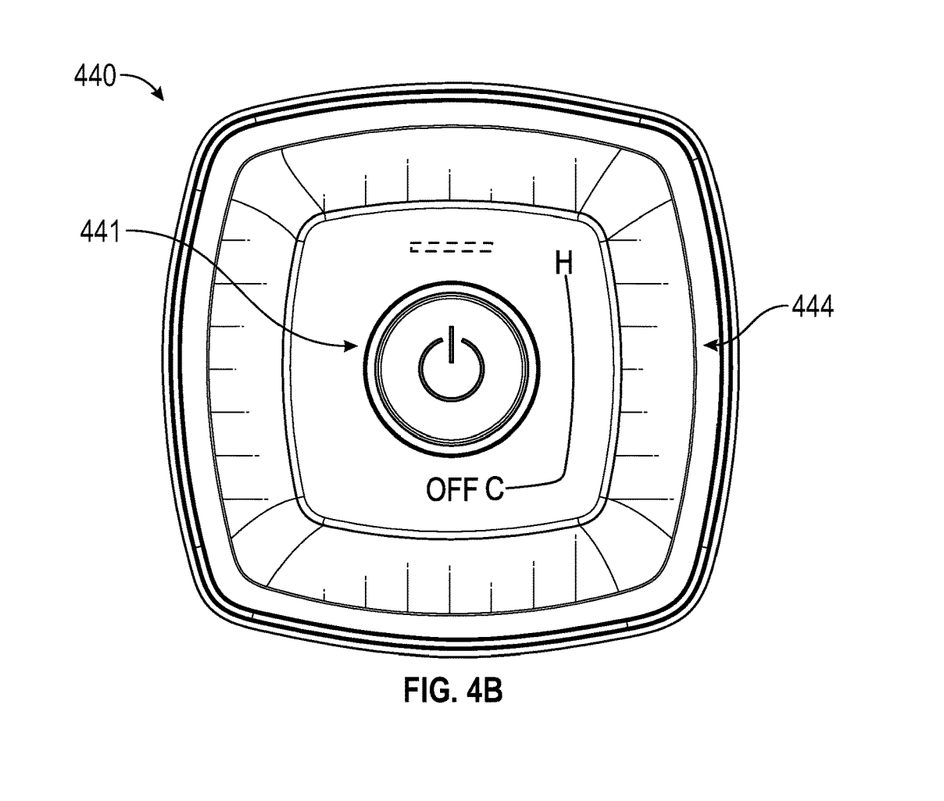

FIG. 4A and FIG. 4B depict push/turn pressure balance valve apparatus 440, according to an embodiment. Assembly 440 comprises push/turn assembly 441 coupled to pressure balance valve/rough-in valve assembly 335. Assembly 335 is visible in FIG. 4A behind face plate 444. A visible portion of push/turn assembly 441 comprises push button 442 and sleeve 443. Push button 442 provides an on/off function. A counter-clockwise turn of assembly 441 increases water temperature; while a clockwise turn of assembly 441 decreases water temperature. A full clockwise turn of assembly 441 also turns water off.

Figure 4C:
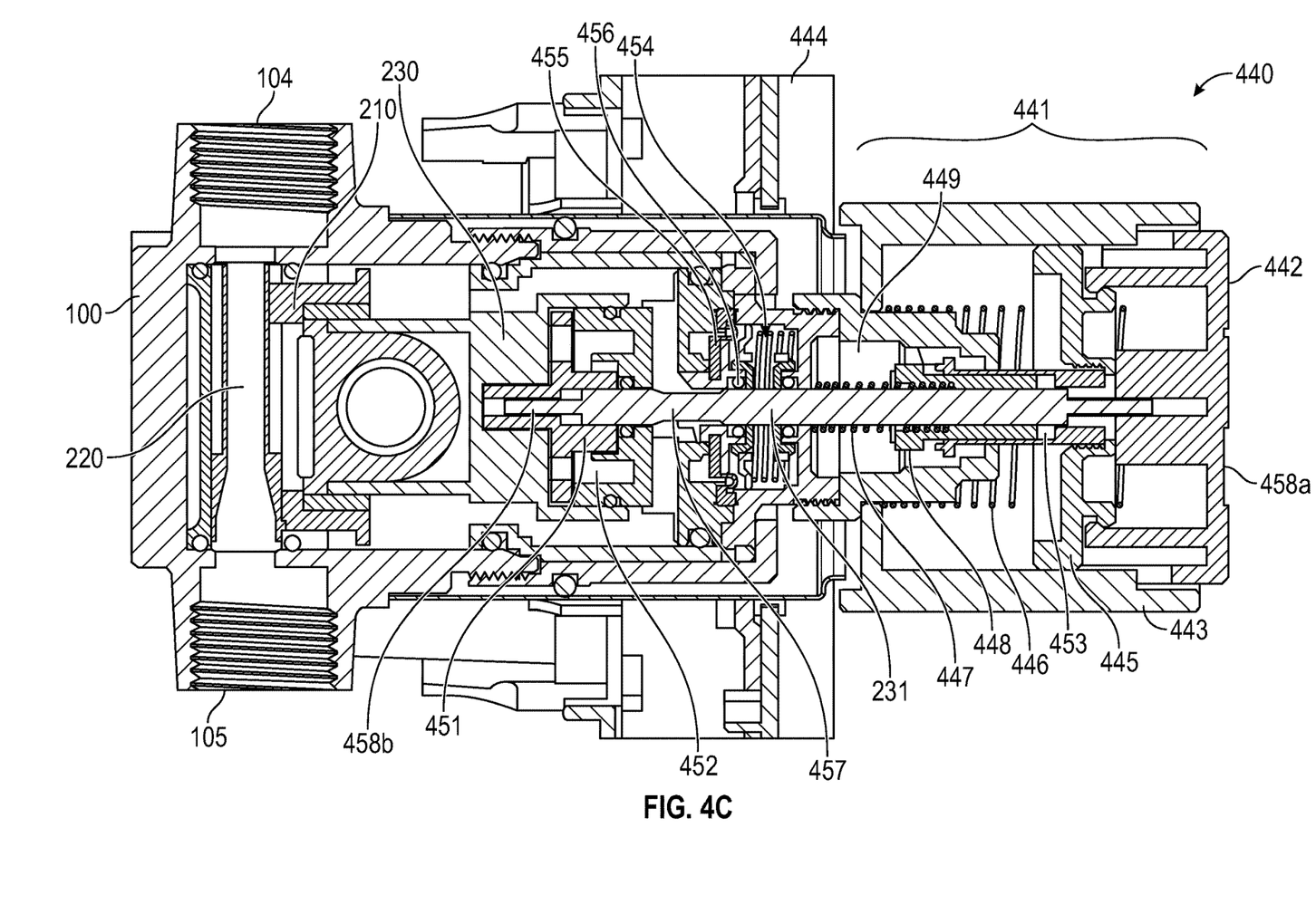
FIG. 4C and FIG. 4D provide cross-section views of a push/turn pressure balance valve apparatus, according to an embodiment.
Figure 4D:
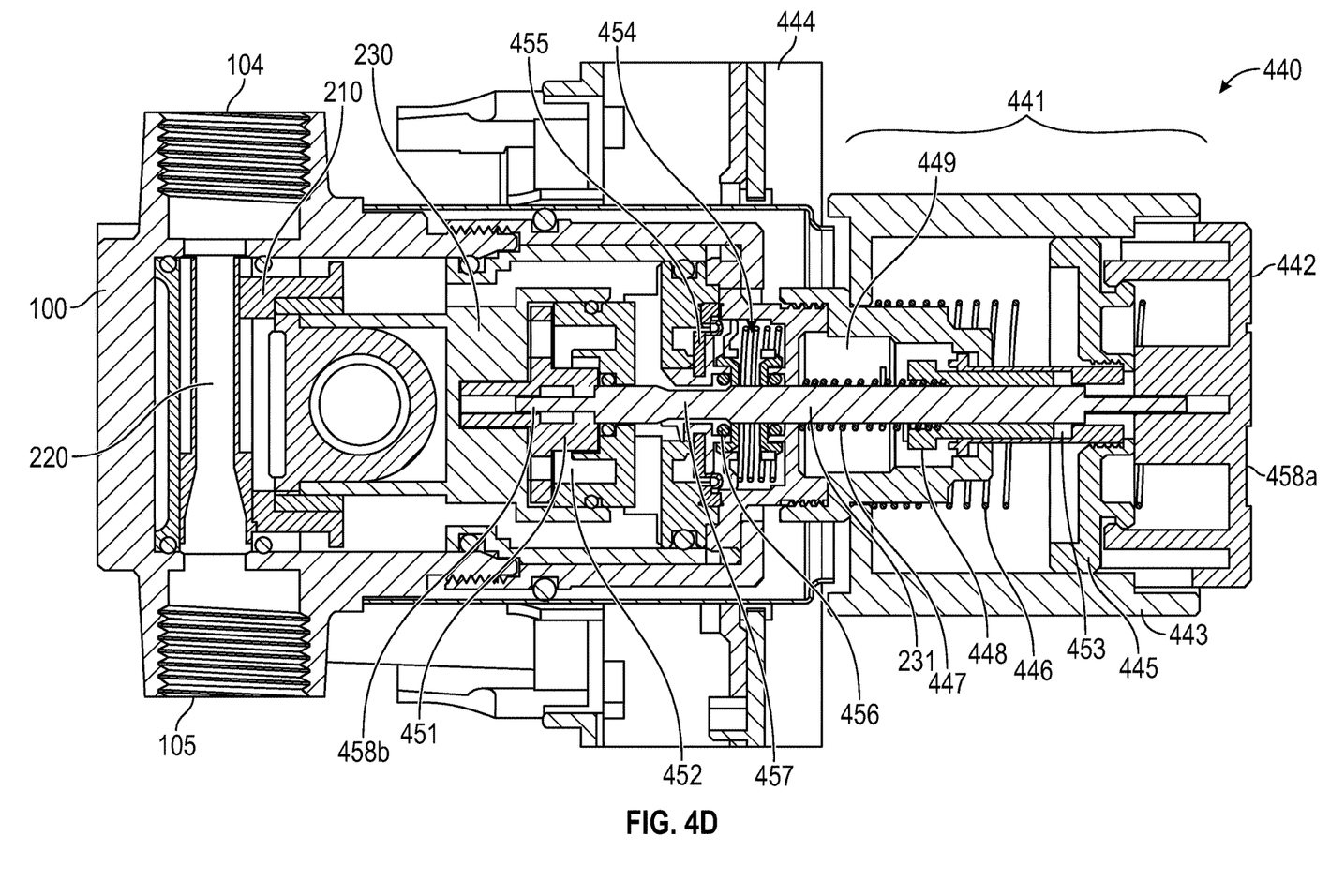

FIG. 4C and FIG. 4D provide cross-section views of push/turn pressure balance valve apparatus 440, according to an embodiment. Visible are rough-in valve 100, manifold 210, pressure balance vale 230, face plate 444, and push/turn assembly 441. Push/turn assembly 441 comprises push button 442, sleeve 443, button back plate 445, outer spring 446, inner spring 447, plunger 448, and cam body 449. Pressure balance valve 230 is shown in a closed position in FIG. 4C and in an open position in FIG. 4D. In an embodiment, a first press/release of button 442 moves button back plate 445, moving plunger 448 against cam body 449. Plunger 448 is caused to rotate and move in an axial direction, thereby moving valve stem 231 in an axial direction. Plunger 448 is configured to rotate and slide within plunger jacket 453. A press/release of button 442 moves valve stem 231 axially in pressure balance valve 230. To open valve 230, valve stem narrow portion 457 is extended past O-ring 456. This lowers pressure in outer chamber 454, allowing diaphragm 455 to move axially, allowing a water mixture to flow out from valve 230.

Rotation of sleeve 443 rotates push button 442, valve stem 231 and valve plate 451, which allows for entry of a certain mix of hot/cold water into mixing chamber 452. Also in this embodiment, full clockwise rotation of sleeve 443 and button 442 results in rotating the valve plate to place the valve in a closed position. Valve stem 231 comprises outer flat portion 458a and inner flat portion 458b. Flat portions 458a and 458b allow button 442 to rotate stem 231, and allow stem to rotate valve plate 451.

Figure 4E:
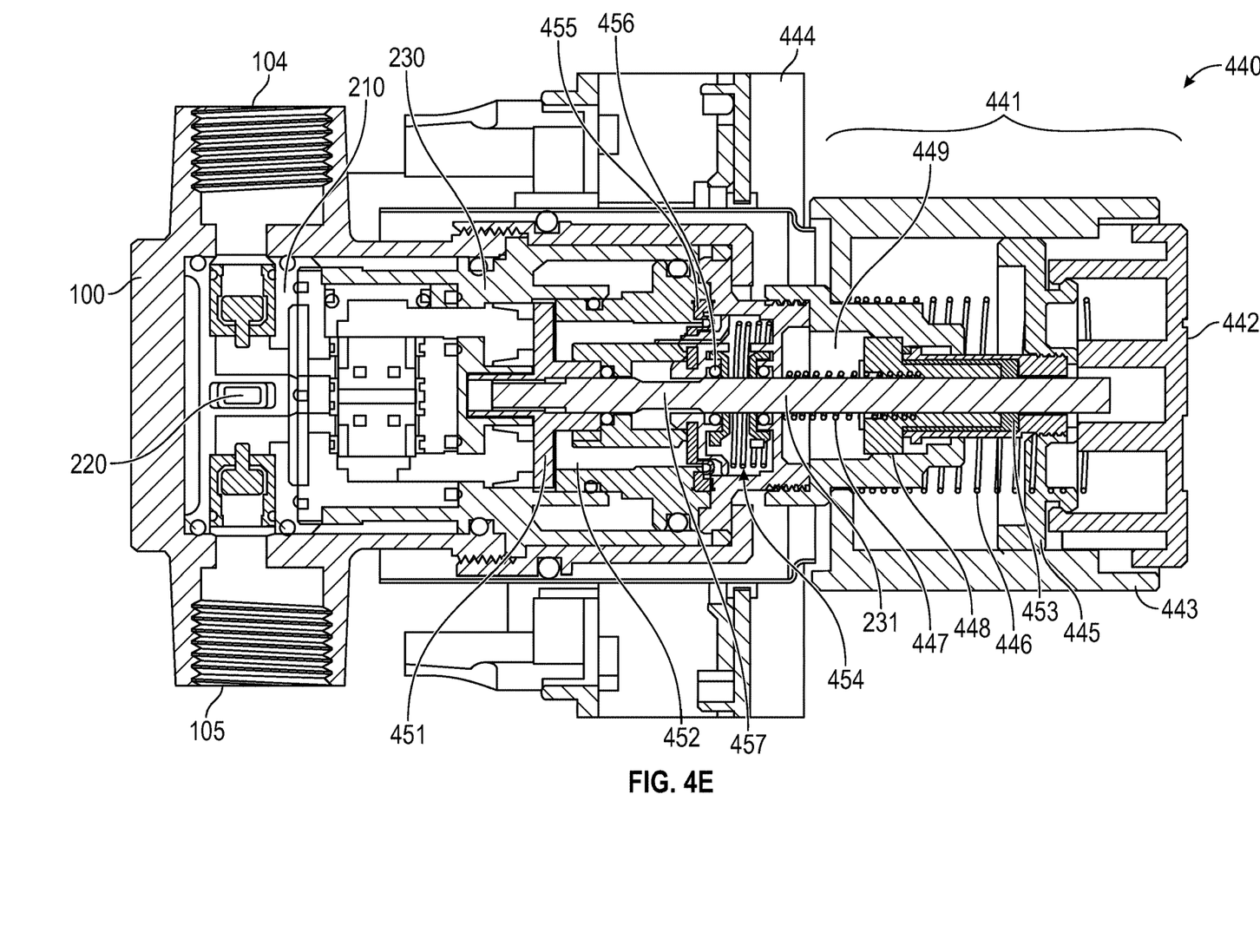
FIG. 4E and FIG. 4F provide cross-section views of a push/turn pressure balance valve apparatus, according to an embodiment.
Figure 4F:
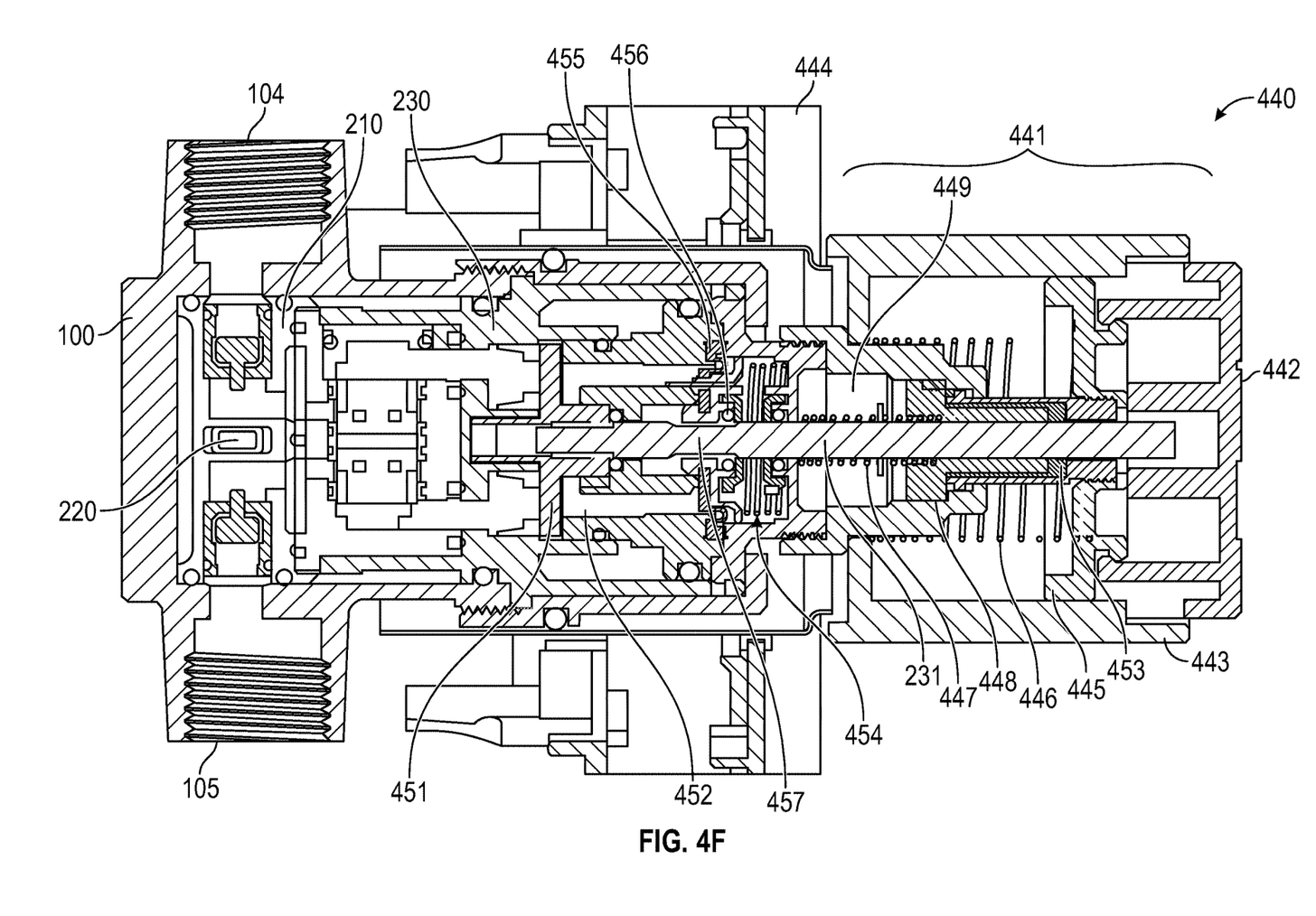

FIG. 4E and FIG. 4F provide cross-section views of pressure balance valve apparatus 440, according to an embodiment. FIG. 4E and FIG. 4F are right angle cross-section views of FIG. 4C and FIG. 4D, respectively. FIG. 4E shows assembly 440 in a closed position and FIG. 4F shows assembly 440 in an open position. Valve 230 is configured such that a counter-clockwise turn allows increased hot source water into mixing chamber 452. A clockwise turn allows less hot source water into mixing chamber 452, thereby lowering water temperature. In an embodiment, a clockwise position may be left at a certain desired temperature setting, while using push button 442 for on/off function. It is seen push button 442 moves laterally (axially) relative to sleeve 443, and that valve stem 231 moves laterally in pressure balance valve 230.

Figure 4G:
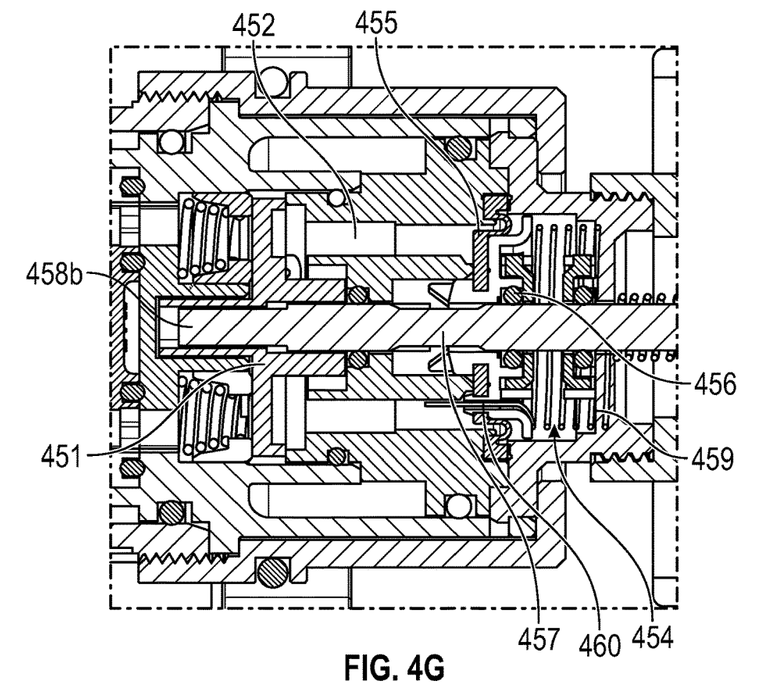
FIG. 4G and FIG. 4H provide expanded cross-section views of a pressure balance valve, according to an embodiment.
Figure 4H:
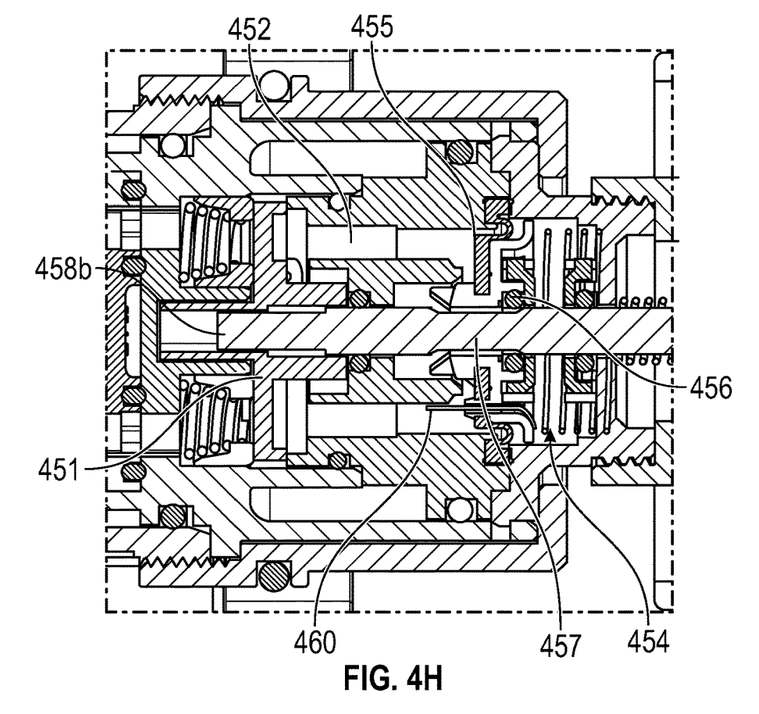

FIG. 4G and FIG. 4H provide expanded cross-section views of pressure balance valve 230 portions in a closed and open position, respectively, according to an embodiment. Visible is valve stem flat portion 458b coupled to valve plate 451. Also visible are mixing chamber 452, outer chamber 454, spring 459, O-ring 456, and diaphragm 455. A first press/release of push button 442 moves valve stem 231 axially, so that valve stem narrow portion 457 extends past 456. This allows fluid to exit outer chamber 454, lowering pressure in outer chamber 454, causing diaphragm 455 to extend axially, and allowing mixed water to exit valve 230. Also visible is cleaning pin 460 extending through a hole in diaphragm 455.

In some embodiments, disclosed is a valve apparatus comprising a push button assembly. A push button assembly may be coupled to a pressure balance valve via a valve stem. In some embodiments, a push button assembly may comprise a push button face coupled to a button back plate. A stem may be coupled to a push button back plate. Operation of a valve may be accomplished via manipulation of a push button face and back plate. In some embodiments, a push button assembly may comprise a plunger and a cam body. A push button assembly plunger may be coupled to a valve stem. A plunger jacket may be coupled to a push button back plate, and a plunger may be positioned in a plunger jacket and configured to rotate within the plunger jacket.

In some embodiments a press/release of a push button moves a valve stem and plunger in a direction substantially aligned with the press/release direction, e.g. "sideways, lateral, or axial direction". In some embodiments, as a plunger moves axially, it engages a cam feature of a cam body, is caused to rotate and slide simultaneously, thereby axially moving the stem to open or close the valve. The stem may also be coupled to a valve plate and configured to rotate the valve plate. A valve plate may comprise orifices that allow passage of hot and cold source water into a mixing chamber and out to a plumbing device. A rotation (rotary) position of a valve plate may determine a valve on/off position, water temperature, and water flow rate.

In some embodiments, a push button assembly may comprise an outer spring and an inner spring which may aid in moving a valve stem in an axial direction and setting its open or closed position. An outer spring may be positioned against a push button back plate. An inner spring may be positioned against a plunger.

In some embodiments, a push button face and back plate and plunger jacket are configured to move axially via a press/release. In some embodiments, a plunger and valve stem are configured to move axially via a press/release. In some embodiments, a rotation plate is configured to rotate via rotation of a valve stem. Rotation of a valve stem may be achieved via rotation of a push button sleeve.

In some embodiments, a full rotation of a push button may place a valve in a closed position, for example a full clockwise rotation. In some embodiments, a full rotation of a push button may place a valve in a full open position, for example a full counter-clockwise rotation. In some embodiments, a full rotation of a push button may place a valve in a maximum temperature position, for example a full counter-clockwise rotation.

In some embodiments, a valve plate may be in an open position, but a valve will not be opened to deliver water unless a first press/release is performed.

In some embodiments, a pressure balance valve may be turned on/off via both or either of a button rotation or a button press/release. In some embodiments, a push button may be left or maintained at a desired optimal temperature setting corresponding to a certain rotary position of the button. The valve may be turned on/off via a press/release, without any operator rotation, with a valve automatically arriving at the desired water temperature without any operator button rotation. If a button rotary position is maintained at a desired temperature position, a button press/release to open a valve may result in axial movement of a valve stem and diaphragm from an off position to a desired hot/cold mix position.

In some embodiments, a first press/release of a push button opens a valve and a second press/release of a push button closes the valve. In some embodiments, if a rotary position of a button is "off", a first press/release will not open the valve. In some embodiments, if a rotary position is "full hot" (maximum temperature), a first press/release will open the valve to a maximum temperature position. In some embodiments, if a rotary position is set to an optimal temperature position, a first/press release will open the valve to the optimal temperature position.

In some embodiments, a push button axial position and rotary position are independent, such that an on/off press/release function and rotary setting function are independent and decoupled.

In some embodiments, a push button may be positioned in a sleeve, wherein the sleeve is configured to remain stationary as a push button is moved axially. In some embodiments, rotation of a button sleeve rotates the push button together with it. That is, a push button and button sleeve may be decoupled in an axial direction and coupled in a rotary direction (for example via one or more ribs).

In an embodiment of the disclosure, a rough-in valve comprises a manifold/fluid mixing valve apparatus. A fluid mixing valve may comprise an adjustable limiter, designed to limit an amount (e.g. percentage) of hot water allowed to flow through the valve. The fluid mixing valve may have an inlet dedicated for hot water and an inlet dedicated for cold water.

In an embodiment, a valve manifold comprises first and second inlets and first and second outlets. The manifold inlets are in flow communication with fluid mixing valve inlets via manifold transitions. In an embodiment, the manifold outlets comprise a passageway extending from the first outlet to the second outlet. In an embodiment, a manifold outlet passageway may contain a venturi tube. A venturi tube ("venturi") may have a first section and a second section, wherein the first section has a larger cross-section area than the second section. In some embodiments, a venturi first section may have a substantially frustoconical shape. In some embodiments, a venturi second section may have a substantially rectangular cross-sectional shape.

In some embodiments, a venturi first section is disposed in a manifold second outlet. In certain embodiments, a venturi first section may be permanently disposed in a manifold outlet. In other embodiments, a venturi first section may be removably disposed in a manifold outlet. In some embodiments, a venturi first section outer surface may form a seal with a manifold outlet inner surface. In an embodiment, the venturi tube may comprise an attachment element configured to permanently fix it in the second manifold outlet. In an embodiment, a venturi may be permanently fixed in a manifold outlet via a one or more tab/notch elements. In a certain embodiment, a venturi may comprise one or more "locking tabs" on an exterior surface of the first section. Upon insertion of a venturi into an outlet pathway, one or more locking tabs positioned on an exterior of the venturi first section may be forced into the outlet pathway and lock in a space or notch on a manifold interior.

In certain embodiments, a check valve may be installed in a first manifold inlet and/or in a second manifold inlet. A check valve may prevent "cross-talk" between hot and cold water sources that may occur due to pressure differences.

In some embodiments, a manifold is configured to be disposed in a rough-in valve in a fixed position. A manifold fixed position may provide that a venturi first section is pointing "down" along the Y axis. In some embodiments, a venturi first section will point down along the Y axis towards a tub supply line and to a tub spout. In some embodiments, a venturi second section will point "up" along the Y axis towards a shower supply line to a shower head.

Thus, in order to place two rough-in valves back-to-back, a total valve apparatus may be rotated around the Y axis to preserve the venturi position. To place the hot/cold water fluid mixing valve inlets in the correct position, the fluid mixing valve may be removed from the manifold, rotated about 180 degrees and re-inserted in the manifold. The back-to-back rough-in valves may now accept hot water from the same side and cold water from the same side.

In certain embodiments, a fluid mixing valve is configured to be inserted into a manifold cavity. A manifold cavity may have a sidewall defining the cavity. A manifold sidewall and/or a fluid mixing valve may comprise certain features designed to provide for reversible attachment of the manifold and fluid mixing valve. For example, certain attachment features may comprise a notch/tab element, a pin/slot element, a pin/hole element, threaded elements, etc. In a certain embodiment, an attachment feature comprises a substantially U-shaped pin and slot element.

In some embodiments, a manifold may contain one or more retainer features to hold an attachment element in place after assembly, and thereby hold a manifold/fluid mixing valve apparatus together. The retainer features may be one or more of notches, tabs, grooves, dimples, etc. A manifold may comprise a plurality of retainer features.

In some embodiments, an exterior of the manifold may comprise one or more grooves configured to receive one or more gaskets. The gaskets may be configured to form a seal with an interior chamber surface of a rough-in valve. In a certain embodiment, a gasket may comprise ring shaped sections connected via strut sections.

In certain embodiments, a valve manifold cavity may comprise a shape configured to couple to a fluid mixing valve shape, so as to only allow proper positioning of the fluid mixing valve at about 180 degree rotation intervals relative to the manifold.

In some embodiments, the valve manifold comprises transitions in flow communication with the manifold inlets. The transitions may be transverse to the manifold inlets and may be positioned towards a center of the manifold. The transitions are configured to be in flow communication with fluid mixing valve inlets. The manifold comprises outlets in flow communication with fluid mixing valve outlets via manifold channels. Manifold channels may be positioned towards an outer section of the manifold, for instance towards a sidewall.

In some embodiments, a manifold comprising a venturi may be substantially symmetrical about a plane bisecting the outlets and venturi.

In some embodiments, a length of a rough-in valve from inlet to inlet is from any of about 100 mm, about 105 mm, about 110 mm, about 120 mm, or about 130 mm to any of about 140 mm, about 150 mm, about 155 mm, about 160 mm, about 170 mm, about 180 mm or more.

In some embodiments, a height of a rough-in valve from outlet to outlet is from any of about 85 mm, about 90 mm, about 95 mm, about 100 mm, or about 105 mm to any of about 110 mm, about 115 mm, about 120 mm, about 125 mm, about 130 mm, about 135 mm or more.

Some rough-in valves are disclosed for example in U.S. application No. PCT/US2018/057014, filed Oct. 23, 2018, published as WO2019083942, and U.S. application No. PCT/US2020/027641, filed Apr. 10, 2020, published as WO/2020/210606, the disclosures of which are hereby incorporated by reference.

Following are some non-limiting embodiments of the disclosure.

In a first embodiment, disclosed is a valve apparatus comprising a push button assembly coupled to a pressure balance valve, wherein the push button assembly comprises a push button configured to be pressed/released and to be rotated, a first press/release of the button opens the valve, a second press/release of the button closes the valve, and a rotation of the button adjusts water temperature.

In a second embodiment, disclosed is a valve apparatus according to the first embodiment, wherein the rotation of the button also adjusts water flow rate. In a third embodiment, disclosed is a valve apparatus according to embodiments 1 or 2, wherein a full rotation of the button closes the valve. In a fourth embodiment, disclosed is a valve apparatus according to any of the preceding embodiments, wherein a full rotation of the button provides a maximum water temperature.

In a fifth embodiment, disclosed is a valve apparatus according to any of the preceding embodiments, wherein the push button assembly is coupled to the pressure balance valve via a valve stem. In a sixth embodiment, disclosed is a valve apparatus according to any of the preceding embodiments, wherein the push button assembly comprises a plunger and cam body.

In a seventh embodiment, disclosed is a valve apparatus according to any of the preceding embodiments, wherein the push button assembly comprises a plunger coupled to a valve stem, the valve stem is coupled to a valve plate, a press/release of the push button rotates the plunger, and moves the plunger and valve stem axially.

In an eighth embodiment, disclosed is a valve apparatus according to any of the preceding embodiments, wherein the push button assembly comprises an outer spring and an inner spring.

In a ninth embodiment, disclosed is a valve apparatus according to any of the preceding embodiments, wherein a first button press/release retracts the valve stem axially from the pressure balance valve, and wherein a second button press/release inserts the valve stem axially into the pressure balance valve.

In a tenth embodiment, disclosed is a valve apparatus according to any of the preceding embodiments, wherein the push button is positioned in a sleeve, and wherein upon a first or second press/release of the push button, the push button is configured to move axially relative to the sleeve.

In an eleventh embodiment, disclosed is a valve apparatus according to any of the preceding embodiments, wherein the push button is positioned in a sleeve, and wherein the push button and the sleeve are configured to be rotated together. In a twelfth embodiment, disclosed is a valve apparatus according to any of the preceding embodiments, wherein a button rotation position may be maintained at an optimal temperature position, and wherein the valve may be opened and closed via the first and second press/release of the button.

In a thirteenth embodiment, disclosed is a valve apparatus according to any of the preceding embodiments, wherein a valve on/off position and temperature setting are decoupled.

In a fourteenth embodiment, disclosed is a valve apparatus according to any of the preceding embodiments, comprising a rough-in valve, wherein the pressure balance valve is positioned in a rough-in valve chamber.

In a fifteenth embodiment, disclosed is a valve apparatus according to any of the preceding embodiments, comprising a manifold, wherein the pressure balance valve is positioned in a manifold cavity. In a sixteenth embodiment, disclosed is a valve apparatus according to any of the preceding embodiments, comprising a manifold and a rough-in valve, wherein the manifold is positioned in a rough-in valve chamber. In a seventeenth embodiment, disclosed is a valve apparatus according to embodiments 15 or 16, wherein the pressure balance valve is removably coupled to the manifold. In an eighteenth embodiment, disclosed is a valve apparatus according to any of embodiments 15 to 17, wherein the manifold is removably disposed in the rough-in valve chamber.

In a nineteenth embodiment, disclosed is a shower or bath assembly comprising the valve apparatus according to any of the preceding embodiments.

In a twentieth embodiment, disclosed is a push button assembly, comprising a push button configured to be pressed/released and to be rotated; and a stem coupled to the button, wherein a press/release of the button moves the stem in a direction of the press/release, a first press/release of the button moves the stem in axial direction, and a second press/release of the button moves the stem in an opposite axial direction. In a twenty-first embodiment, disclosed is a push button assembly according to embodiment 20, wherein the push button assembly comprises a plunger and cam body.

In a twenty-second embodiment, disclosed is a push button assembly according to embodiments 20 or 21, wherein the push button assembly is coupled to the stem, the stem is coupled to a plate, a rotation of the button is configured to rotate the stem and plate.

In a twenty-third embodiment, disclosed is a push button assembly according to any of embodiments 20 to 22, comprising an outer spring and an inner spring. In a twenty-fourth embodiment, disclosed is a push button assembly according to any of embodiments 20 to 23, wherein the push button is positioned in a sleeve, and wherein upon a first or second press/release of the push button, the push button is configured to move axially relative to the sleeve.

In a twenty-fifth embodiment, disclosed is a push button assembly according to any of embodiments 20 to 24, wherein the push button is positioned in a sleeve, and wherein the sleeve and push button are configured to rotate together.

In a twenty-sixth embodiment, disclosed is a push button assembly according to any of embodiments 20 to 25, wherein a button rotation position may be maintained at an optimal position, and wherein the first and second press/release of the button may be performed while maintaining the optimal rotation position.

In a twenty-seventh embodiment, disclosed is a push button assembly according to any of embodiments 20 to 26, wherein a button axial position indicates an on/off position and a button rotary position indicates a setting position, and wherein the on/off position and rotary position are decoupled.

The term "adjacent" may mean "near" or "close-by" or "next to".

The term "coupled" means that an element is "attached to" or "associated with" another element. Coupled may mean directly coupled or coupled through one or more other elements. An element may be coupled to an element through two or more other elements in a sequential manner or a non-sequential manner. The term "via" in reference to "via an element" may mean "through" or "by" an element. Coupled or "associated with" may also mean elements not directly or indirectly attached, but that they "go together" in that one may function together with the other.

The term "flow communication" means for example configured for liquid or gas flow there through and may be synonymous with "fluidly coupled". The terms "upstream" and "downstream" indicate a direction of gas or fluid flow, that is, gas or fluid will flow from upstream to downstream.

The term "towards" in reference to a of point of attachment, may mean at exactly that location or point or, alternatively, may mean closer to that point than to another distinct point, for example "towards a center" means closer to a center than to an edge.

The term "like" means similar and not necessarily exactly like. For instance "ring-like" means generally shaped like a ring, but not necessarily perfectly circular.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more. All numeric values are modified by the term "about" whether or not explicitly indicated. Numeric values modified by the term "about" include the specific identified value. For example "about 5.0" includes 5.0.

The term "substantially" is similar to "about" in that the defined term may vary from for example by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more of the definition; for example the term "substantially perpendicular" may mean the 90° perpendicular angle may mean "about 90°". The term "generally" may be equivalent to "substantially".

Features described in connection with one embodiment of the disclosure may be used in conjunction with other embodiments, even if not explicitly stated.

Embodiments of the disclosure include any and all parts and/or portions of the embodiments, claims, description and figures. Embodiments of the disclosure also include any and all combinations and/or sub-combinations of embodiments.

The invention claimed is:

1. A valve apparatus comprising a push button assembly coupled to a pressure balance valve,
wherein
the push button assembly comprises a push button configured to be pressed/released and to be rotated,
the push button is positioned in a sleeve,
the push button and the sleeve are decoupled in an axial direction and are coupled in a rotary direction,
a first press/release of the push button opens the pressure balance valve,
a second press/release of the push button closes the pressure balance valve,
a rotation of the push button adjusts a water temperature,
the push button moves axially relative to the sleeve during the first and second press/release, and
the push button and the sleeve rotate together.

2. The valve apparatus according to claim 1, wherein the rotation of the push button also adjusts a water flow rate.

3. The valve apparatus according to claim 1, wherein a full rotation of the push button in a first direction closes the pressure balance valve.

4. The valve apparatus according to claim 1, wherein a full rotation of the push button in a second direction provides a maximum water temperature.

5. The valve apparatus according to claim 1, wherein
the push button assembly comprises a plunger coupled to a valve stem,
the valve stem is coupled to a valve plate, and
the first and second press/release of the push button rotates the plunger, and moves the plunger and valve stem axially.

6. The valve apparatus according to claim 1, wherein the push button assembly comprises an outer spring and an inner spring.

7. The valve apparatus according to claim 1, wherein a full rotation of the push button in a second direction places the pressure balance valve in a fully open position.

8. The valve apparatus according to claim 1, wherein the push button assembly comprises a plunger, a cam body, a valve stem, and a valve plate, wherein
the push button assembly is coupled to the pressure balance valve via the valve stem,
the plunger is coupled to the valve stem,
the valve stem is coupled to the valve plate, and
the first and the second push button press/release rotates the plunger and moves the plunger and valve stem axially.

9. The valve apparatus according to claim 1, wherein a push button rotation position may be maintained at an optimal temperature position, and wherein the pressure balance valve may be opened and closed via the first and second press/release of the push button.

10. The valve apparatus according to claim 1, wherein a pressure balance valve on/off position and temperature setting are decoupled.

11. The valve apparatus according to claim 1, wherein the push button assembly comprises a plunger and a cam body and is coupled to the pressure balance valve via a valve stem.

12. The valve apparatus according to claim 11, wherein the first push button press/release retracts the valve stem axially from the pressure balance valve, and the second push button press/release inserts the valve stem axially into the pressure balance valve.

13. The valve apparatus according to claim 1, comprising a rough-in valve, wherein the pressure balance valve is positioned in a rough-in valve chamber.

14. The valve apparatus according to claim 13, comprising a manifold, wherein the pressure balance valve is positioned in a manifold cavity, and wherein the manifold is positioned in the rough-in valve chamber.

15. The valve apparatus according to claim 14, wherein the pressure balance valve is removably coupled to the manifold.

16. The valve apparatus according to claim 14, wherein the manifold is removably disposed in the rough-in valve chamber.

17. A push button assembly, comprising
a push button configured to be pressed/released and to be rotated; and
a stem coupled to the push button and to a plate,
wherein
the push button is positioned in a sleeve,
the push button and the sleeve are decoupled in an axial direction and are coupled in a rotary direction
a press/release of the push button moves the stem in a direction of the press/release,
a first press/release of the push button moves the stem in axial direction,
a second press/release of the push button moves the stem in an opposite axial direction,
a rotation of the push button is configured to rotate the stem and plate,
the push button moves axially relative to the sleeve during the first and second press/release, and
the push button and the sleeve rotate together.

18. The push button assembly according to claim 17, comprising a plunger and a cam body, wherein the plunger is coupled to the stem, and the first and the second push button press/release rotates the plunger and moves the plunger and stem axially.

19. The push button assembly according to claim 17, wherein a push button rotation position may be maintained at an optimal position, and wherein the first and second press/release of the push button may be performed while maintaining the optimal rotation position.

20. The push button assembly according to claim 17, wherein a push button axial position indicates an on/off position and a push button rotary position indicates a setting position, and wherein the on/off position and the rotary position are decoupled.

\* \* \* \* \*